United States Patent
Collê et al.

(10) Patent No.: US 10,985,944 B2
(45) Date of Patent: Apr. 20, 2021

(54) ROUTING GATEWAY AND METHOD FOR AUTOMOTIVE VEHICLE

(71) Applicants: Continental Automotive France, Toulouse (FR); Continental Automotive GmbH, Hannover (DE)

(72) Inventors: Thibaud Collê, Toulouse (FR); David Mothais, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 16/971,065

(22) PCT Filed: Feb. 8, 2019

(86) PCT No.: PCT/FR2019/050278
§ 371 (c)(1),
(2) Date: Aug. 19, 2020

(87) PCT Pub. No.: WO2019/166712
PCT Pub. Date: Sep. 6, 2019

(65) Prior Publication Data
US 2021/0058270 A1 Feb. 25, 2021

(30) Foreign Application Priority Data
Feb. 27, 2018 (FR) ...................................... 1851669

(51) Int. Cl.
*H04L 12/24* (2006.01)
*H04L 12/12* (2006.01)
(Continued)

(52) U.S. Cl.
CPC .......... *H04L 12/4625* (2013.01); *H04L 12/12* (2013.01); *H04L 12/40169* (2013.01);
(Continued)

(58) Field of Classification Search
CPC ........................... H04L 12/4625; H04L 12/12; H04L 12/40169
See application file for complete search history.

(56) References Cited

U.S. PATENT DOCUMENTS 6,085,328 A 7/2000 Klein et al.
9,021,075 B2 * 4/2015 Rocher ............. H04L 12/40039
709/223
(Continued)

FOREIGN PATENT DOCUMENTS

FR 2940477 A1 6/2010

OTHER PUBLICATIONS

International Search Report and Written Opinion for International Application No. PCT/FR2019/050278, dated Apr. 10, 2019, with partial translation, 8 pages.
(Continued)

*Primary Examiner* — Rasheed Gidado
(74) *Attorney, Agent, or Firm* — RatnerPrestia

(57) ABSTRACT

A method for routing a data frame in a communication system on board a motor vehicle. The method includes a step of determining, on the basis of a first list and a second list, a "target" list indicating, for each communication network of the system, whether the transmission state of the communication network is active or has to switch to the active state to transmit the equipment data, and for each communication network in the target list, and if the transmission state of the communication network is inactive but has to switch to the active transmission state to transmit the equipment data, a step of activating the communication network and a step of transmitting the equipment data over the communication network, or if the communication network communication is already in the active transmission state, a step of transmitting the equipment data over the communication network.

13 Claims, 1 Drawing Sheet

(51) Int. Cl.
    *G06F 15/173*     (2006.01)
    *H04L 12/46*     (2006.01)
    *H04L 12/40*     (2006.01)

(52) U.S. Cl.
    CPC ............... *H04L 2012/40215* (2013.01); *H04L 2012/40273* (2013.01)

(56) References Cited

U.S. PATENT DOCUMENTS

| | | | |
|---|---|---|---|
| 9,276,822 B2 * | 3/2016 | Messner | H04L 41/32 |
| 9,780,967 B2 * | 10/2017 | Sargent | G07C 5/008 |
| 9,876,857 B2 * | 1/2018 | Kim | H04L 67/12 |
| 10,152,111 B2 * | 12/2018 | Warneke | H03L 5/02 |
| 2006/0013237 A1 | 1/2006 | Furuta et al. | |
| 2018/0295011 A1 * | 10/2018 | Wang | H04L 12/12 |
| 2020/0059383 A1 * | 2/2020 | Kawauchi | H04L 12/28 |

OTHER PUBLICATIONS

International Search Report and Written Opinion for International Application No. PCT/FR2019/050278, dated Apr. 10, 2019, 12 pages (French).
English Translation of the Written Opinion for International Application No. PCT/ER2019/050278, dated Apr. 10, 2019, 6 pages.

\* cited by examiner

ROUTING GATEWAY AND METHOD FOR AUTOMOTIVE VEHICLE

CROSS REFERENCE TO RELATED APPLICATIONS

This application is the U.S. National Phase Application of PCT International Application No. PCT/FR2019/050278, filed Feb. 8, 2019, which claims priority to French Patent Application No. 1851669, filed Feb. 27, 2018, the contents of such applications being incorporated by reference herein.

FIELD OF THE INVENTION

The present invention relates to the automotive field and more specifically to the communication networks connecting the electronic equipment on board a motor vehicle.

BACKGROUND OF THE INVENTION

Nowadays, a motor vehicle comprises, in a known manner, a communication system allowing the electronic equipment of the vehicle to communicate with computers on board said vehicle. In a known communication system architecture, the items of electronic equipment are grouped together according to their location in the vehicle. For example, a group of items of equipment relating to the instrument panel of the vehicle may include a vehicle speed sensor, an engine temperature sensor and the vehicle light units in order to allow the computer to which they are connected to display the information that they transmit on a screen of said instrument panel.

Each group of items of equipment is connected to a computer which receives the data made available by the items of equipment of a group in order to process or transfer the data to another computer, via a communication network. In a known manner, these communication networks are of the "CAN (Controller Area Network) bus" type, well known to those skilled in the art. More specifically, a CAN bus is a communication network based on the principle of multiplexing according to which several data frames may circulate over the same physical communication link.

In order to be able to communicate the data over a communication network, each computer encapsulates the data in frames that each include in particular, in addition to one or more items of data to be communicated, an identifier making it possible to determine the network connecting the gateway computer to the computer that is the recipient of the data frame. In order to connect several communication networks together, the system comprises, in a known manner, a routing gateway which makes it possible to transfer the frames between the computers. In particular, in order to simplify the architecture of the system, it is known practice to implement this routing gateway function in one of the computers. Thus, in such an architecture, each computer is connected to the "gateway" computer via a communication network.

In order to perform the routing function, the gateway computer is in particular configured to control the activation of the transmission of data frames over each of the communication networks and memorize the transmission status of each of the communication networks.

From the point of view of the gateway computer, the transmission state of each communication network is either inactive or active. The active transmission state of a communication network indicates that the gateway computer is transmitting data over said network. When the network connecting the gateway computer and a recipient computer is already in the active transmission state, the gateway computer may directly transmit a data frame via said network. However, when the network connecting the gateway computer and a recipient computer is in the inactive transmission state, the gateway computer first has to activate said network to switch it to the active transmission state, then transmit the one or more data frames.

When it receives a data frame sent by a "sender" computer to one or more "recipient" computers, the gateway computer carries out, for each network to which it is connected, according to a predetermined list, a series of steps. First of all, the gateway computer evaluates whether the identifier contained in the received data frame is associated with the computer of the first network on the list. If this is not the case, the computer evaluates whether the identifier contained in the received data frame is associated with the computer of the second network on the list and restarts the series of steps; however, if this is the case, the gateway computer analyzes the transmission state for transmission to the first network.

If the transmission state of the first network is active, the gateway computer makes the data frame available to said first network. If the transmission state of the first network is inactive, the gateway computer switches the transmission state of the first network to the active state, then makes the data frame available to said first network whose transmission state has been activated.

In the solution of the prior art, this series of steps is carried out, as necessary, for each network in the order of the predetermined list of networks, which is particularly time consuming and resource consuming for the gateway computer. Now, a substantial constraint of this type of routing method is the routing time. Specifically, since the number of messages received per second by the gateway computer may be high, the time taken to carry out all of the steps of the method for each message may thus increase the overall routing time. Therefore, this method in such a form works, but it is not time optimized.

SUMMARY OF THE INVENTION

There is therefore a need for an optimized solution that makes it possible to decrease the execution time, and thus avoid overloading the gateway computer.

To this end, a first aspect of the invention is a method for routing a data frame in a communication system on board a motor vehicle, said communication system comprising a routing gateway and a plurality of computers, each computer being connected to said routing gateway by a communication network, the transmission state of each communication network being either active or inactive, the method, implemented by the gateway, being characterized in that it comprises:

a step of the gateway receiving a data frame sent by a first computer called "sender", said data frame comprising an item of data relating to an item of electronic equipment of the vehicle called "equipment data" and at least one identifier making it possible to determine the one or more communication networks connecting the gateway to at least one second computer that is the recipient of said equipment data;

a step of determining a first list specifying the active or inactive transmission state of each communication network;

a step of determining, on the basis of the one or more identifiers contained in the received data frame, a second list specifying, for each communication network, whether said communication network has to be switched to its active transmission state to transmit the equipment data;

a step of determining, on the basis of the first determined list and the second determined list, what is called a "target" list indicating whether the transmission state of each communication network is active or has to switch to the active state to transmit the equipment data; and for each communication network on the target list:

if said communication network is in the inactive transmission state but has to switch to the active transmission state to transmit the equipment data, a step of activating said communication network and a step of transmitting the equipment data over said communication network; or if said communication network is already in the active transmission state, a step of transmitting the equipment data over said communication network.

The routing method according to an aspect of the invention makes it possible to limit the number of operations required for the activation of one or more communication networks so as to make the routing of data frames both fast and efficient. Specifically, the method makes it possible to determine the one or more networks to be activated as necessary, such that it is no longer necessary to analyze the state of the networks in turn according to a predetermined order.

Preferably, the inactive transmission state of a communication network being represented by the binary value 0 and the active transmission state of a communication network being represented by the binary value 1, the transmission state of a communication network having to be switched to its active state to transmit the equipment data being represented by the binary value 1, and the transmission state of a communication network not having to be switched to its active state to transmit the equipment data being represented by the binary value 0, the target list comprises, for each communication network, a value corresponding to the non-exclusive sum of the binary value representing the transmission state of said communication network and the binary value indicating whether the transmission state of said communication network has to be switched to the active state or not.

Advantageously, the method further comprises a step of identifying, on the basis of the first list and the target list, the one or more communication networks that are already in the active transmission state and do not need to be switched to the active transmission state.

According to one aspect of the invention, the one or more communication networks that are already in the active transmission state and do not need to be switched to the active transmission state are identified by calculating, for each communication network, the exclusive sum of the binary value representing the state of said communication network and the binary value of the target list relating to said communication network.

Preferably, the gateway is implemented by one of the computers of the communication system.

An aspect of the invention also relates to a gateway for routing at least one data frame, said gateway being intended for a communication system of a motor vehicle, said communication system further comprising a plurality of computers and a plurality of communication networks, each computer being connected to the gateway by a communication network, each communication network being either in an active transmission state or in an inactive transmission state, the gateway being characterized in that it is configured for:

receiving a data frame sent by a first computer called "sender", said data frame comprising an item of data relating to an item of electronic equipment of the vehicle called "equipment data" and at least one identifier making it possible to determine the one or more communication networks connecting the gateway to at least one second computer that is the recipient of said equipment data;

determining a first list specifying the active or inactive transmission state of each communication network;

determining, on the basis of the one or more identifiers contained in the received data frame, a second list specifying, for each communication network, whether said communication network has to be switched to its active transmission state to transmit the equipment data;

determining, on the basis of the first determined list and the second determined list, what is called a "target" list indicating whether the transmission state of each communication network is active or has to switch to the active state to transmit the equipment data;

activating a communication network; and transmitting an item of equipment data to a communication network.

An aspect of the invention also relates to a system for communicating data frames for a motor vehicle, said communication system comprising a gateway as described above, a plurality of computers and a plurality of communication networks, each computer being connected to said gateway by a communication network, each communication network being either in an active transmission state or in an inactive transmission state.

Preferably, the gateway is implemented by one of the computers of the communication system.

In one embodiment, each computer is connected to said gateway by a single communication network.

An aspect of the invention lastly relates to a motor vehicle comprising a communication system as presented above.

BRIEF DESCRIPTION OF THE DRAWINGS

Other features and advantages of aspects of the invention will become apparent from the following description, given with reference to the appended figures that are given by way of non-limiting example and in which identical references are given to similar objects.

DETAILED DESCRIPTION OF THE PREFERRED EMBODIMENTS

Figure 1:
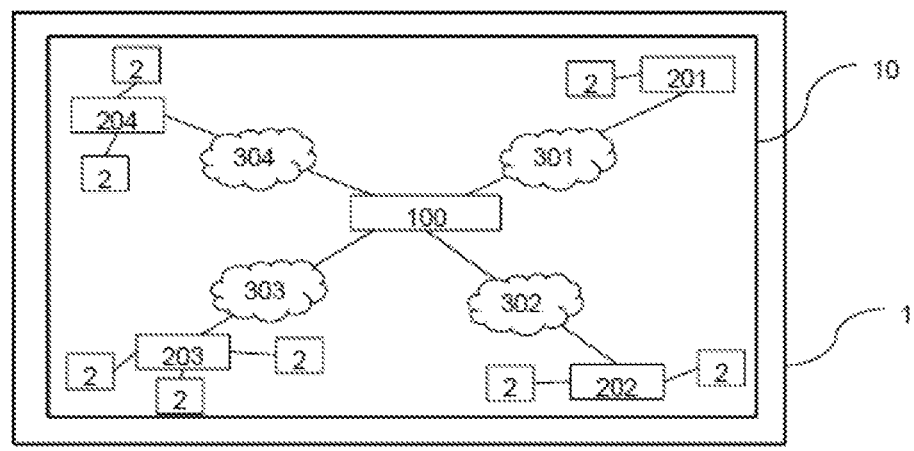
FIG. 1 shows one embodiment of the communication system according to an aspect of the invention.

FIG. 1 shows an exemplary vehicle 1 comprising a system 10 according to an aspect of the invention.

According to FIG. 1, in the context of an aspect of the invention, a motor vehicle 1 comprises a plurality of items of electronic equipment 2 (for example of different type) and a communication system 10 for transferring data frames generated by said items of electronic equipment 2.

The communication system 10 comprises a routing gateway 100, a plurality of computers 201, 202, 203, 204 and a plurality of communication networks 301, 302, 303, 304. It should be noted in particular that the number of computers and communication networks does not limit the scope of an aspect of the present invention.

Each computer 201, 202, 203, 204 is connected to the gateway 100 by one of the communication networks 301, 302, 303, 304. It should be noted that, in another embodiment, several computers could be connected to the gateway 100 by one and the same communication network.

Each computer 201, 202, 203, 204 is configured to receive data from the electronic equipment 2 to which it is connected and to transmit these data in data frames to another computer 201, 202, 203, 204 via the communication networks 301, 302, 303, 304 and the gateway 100.

Each data frame comprises an item of data relating to an item of electronic equipment 2 of the vehicle 1 called "equipment data" and at least one identifier making it possible to determine the one or more communication networks 301, 302, 303, 304 connecting the gateway 100 to at least one second computer 201, 202, 203, 204 called "recipient" of said equipment data. In other words, the identifier makes it possible to know through which one or more communication networks 301, 302, 303, 304 the data frame will have to circulate.

The plurality of communication networks 301, 302, 303, 304 makes it possible to connect the computers 201, 202, 203, 204 to the routing gateway 100 in order to communicate the data frames. Preferably, this connection is made by a single communication network.

Each communication network 301, 302, 303, 304 is in the form of a CAN bus characterized by its state. More precisely, at a given time and from the point of view of the gateway, the transmission state of a communication network 301, 302, 303, 304 is either active, in which it is capable of receiving data, or inactive, in which it is inoperative.

In this example, the gateway 100 is implemented by a computer on board the vehicle 1, for example of BCM ("Body Control Module") type.

The routing gateway 100 is configured to receive a data frame sent by a first computer 201, 202, 203, 204 called "sender", said data frame comprising an item of data relating to an item of electronic equipment 2 of the vehicle 1 called "equipment data", and at least one identifier making it possible to determine the one or more communication networks 301, 302, 303, 304 connecting the gateway 100 to at least one second, recipient computer 201, 202, 203, 204.

The gateway 100 is configured to determine a first list specifying the active or inactive transmission state of each communication network 301, 302, 303, 304. This transmission state is managed by the gateway 100 which thus has information on the transmission state of each communication network 301, 302, 303, 304. Next, the gateway 100 determines, using this first list and on the basis of the one or more identifiers that make it possible to determine the one or more communication networks 301, 302, 303, 304 connecting the gateway 100 to at least one second, recipient computer 201, 202, 203, 204 that is contained in the received data frame, a second list specifying, for each communication network 301, 302, 303, 304, whether the transmission state of the communication network 301, 302, 303, 304 has to be switched to the active state to transmit the equipment data. Lastly, the gateway 100 determines, on the basis of the first determined list and the second determined list, what is called a "target" list indicating, for each communication network 301, 302, 303, 304, whether the transmission state of the communication network 301, 302, 303, 304 is already active or if it has to be switched to the active state to transmit the equipment data.

The gateway 100 is configured to activate a data frame transmission over the communication networks 301, 302, 303, 304 and to transmit one or more items of equipment data to one or more communication networks 301, 302, 303, 304.

According to a preferred embodiment, the gateway is configured to identify, on the basis of the first list and the target list, the one or more communication networks 301, 302, 303, 304 that are already in the active transmission state and do not need to be switched to the active transmission state.

Figure 2:
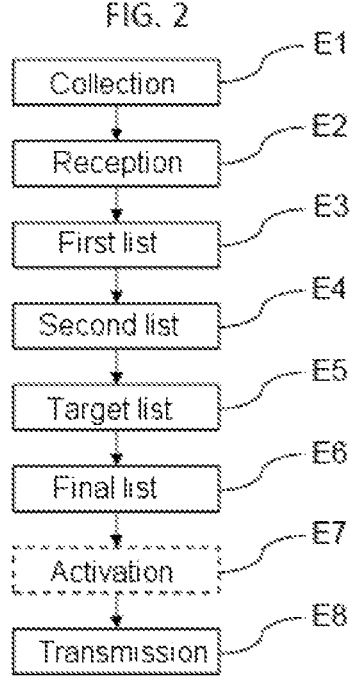
FIG. 2 illustrates one embodiment of the routing method according to an aspect of the invention.

In what follows, the routing method is explained with reference to FIG. 2. In this non-limiting exemplary implementation, the computer 201 collects the data from the electronic equipment 2 to which it is connected and sends the data in various frames to the computers 202 and 204 which need to use these data, but not to the computer 203 which does not need them.

First of all, the computer 201 called "sender" collects the data from the electronic equipment 2 to which it is connected in a step E1. The sender computer 201 then selects the common data to be sent to one or more of the other computers 202, 203, 204 and encapsulates said data in a data frame. In this example, the data intended for the computers 202 and 204 are encapsulated in a data frame and then sent by the sender computer 201 to the routing gateway 100 via the communication network 301 which receives them in a step E2.

Once the data frame has been received, the gateway 100 determines the transmission state (active or inactive) of each one from the set of communication networks 301, 302, 303, 304, and groups this information into a first list in which the active transmission state of a communication network 301, 302, 303, 304 is represented by the binary value 1, and the inactive transmission state of a communication network 301, 302, 303, 304 is represented by the binary value 0 (step E3).

In the example, as illustrated in table 1, the transmission state of the communication networks 301 and 302 is in the active state while the transmission state of the communication networks 303 and 304 is in the inactive state:

TABLE 1

| first list | | | | |
|---|---|---|---|---|
| Network | 301 | 302 | 303 | 304 |
| Transmission state | 1 | 1 | 0 | 0 |

The gateway 100 then analyzes the various fields of the frame and then determines, in a step E4, a second list specifying, for each communication network 301, 302, 303, 304, whether said communication network is the recipient of the data frame, i.e. whether an identifier makes it possible to determine that said communication network is a communication network to receive the data frame.

If this is the case, a binary value 1 is associated in this second list with said communication network 302, 304; otherwise a binary value 0 is associated with said communication network 301, 303.

TABLE 2

| second list | | | | |
|---|---|---|---|---|
| Network | 301 | 302 | 303 | 304 |
| Recipient | 0 | 1 | 0 | 1 |

In a step E5, the gateway 100 determines, on the basis of the first list and the second list, what is called a "target" list indicating, for each communication network 301, 302, 303, 304, whether the transmission state of this network is already active or is inactive but has to switch to the active state to transmit the data frame. This target list corresponds to the non-exclusive sum of the binary values of the first list and of the second list:

TABLE 3 target list

| Network | 301 | 302 | 303 | 304 |
|---|---|---|---|---|
| Recipient | 1 | 1 | 0 | 1 |

In a step E6, the gateway 100 determines, on the basis of the first list and the target list, what is called a "final" list indicating the communication networks 301, 302, 303, 304 whose transmission state has to be switched to the active state by the gateway 100 to transmit the data frame. This target list corresponds to the exclusive sum of the binary values of the first list and of the target list. Thus, in this example, from among the recipient communication networks 302 and 304, only the transmission state of the communication network 304 has to be activated, since the communication network 302 has already been activated:

TABLE 4 final list

| Network | 301 | 302 | 303 | 304 |
|---|---|---|---|---|
| Recipient | 0 | 0 | 0 | 1 |

Once the final list has been established, the gateway 100 activates the communication network 304 (step E7) and transmits the equipment data to the communication networks 302 and 304 (once the latter has been activated) in a step E8.

It should be noted that the activation step E7 is only necessary when a recipient communication network is not in the active transmission state.

The invention claimed is:

1. A method for routing a data frame in a communication system on board a motor vehicle, said communication system comprising a routing gateway and a plurality of computers, each computer being connected to said routing gateway by a communication network, the transmission state of each communication network being either active or inactive, the method, implemented by the gateway, comprising:
   a step of the gateway receiving a data frame sent by a first computer called "sender", said data frame comprising an item of data relating to an item of electronic equipment of the vehicle called "equipment data", and at least one identifier making it possible to determine the one or more communication networks connecting the gateway to at least one second computer that is the recipient of said equipment data;
   a step of determining a first list specifying the active or inactive transmission state of each communication network;
   a step of determining, on the basis of the one or more identifiers contained in the received data frame, a second list specifying, for each communication network, whether said communication network has to be switched to its active transmission state to transmit the equipment data;
   a step of determining, on the basis of the first determined list and the second determined list, what is called a "target" list indicating whether the transmission state of each communication network is active or has to switch to the active state to transmit the equipment data; and
   for each communication network on the target list:
      if said communication network is in the inactive transmission state but has to switch to the active transmission state to transmit the equipment data, a step of activating said communication network and a step of transmitting the equipment data over said communication network; or
      if said communication network is already in the active transmission state, a step of transmitting the equipment data over said communication network.

2. The method as claimed in claim 1, wherein, the inactive transmission state of a communication network being represented by the binary value 0 and the active transmission state of a communication network being represented by the binary value 1, the transmission state of a communication network having to be switched to its active state to transmit the equipment data being represented by the binary value 1, and the transmission state of a communication network not having to be switched to its active state to transmit the equipment data being represented by the binary value 0, the target list comprises, for each communication network, a value corresponding to the non-exclusive sum of the binary value representing the transmission state of said communication network and the binary value indicating whether the transmission state of said communication network has to be switched to the active state or not.

3. The method as claimed in claim 1, further comprising a step of identifying, on the basis of the first list and the target list, the one or more communication networks that are already in the active transmission state and do not need to be switched to the active transmission state.

4. The method as claimed in claim 2, wherein the one or more communication networks that are already in the active transmission state and do not need to be switched to the active transmission state are identified by calculating, for each communication network, the exclusive sum of the binary value representing the state of said communication network and the binary value of the target list relating to said communication network.

5. The method as claimed in claim 2, further comprising a step of identifying, on the basis of the first list and the target list, the one or more communication networks that are already in the active transmission state and do not need to be switched to the active transmission state.

6. The method as claimed in claim 3, wherein the one or more communication networks that are already in the active transmission state and do not need to be switched to the active transmission state are identified by calculating, for each communication network, the exclusive sum of the binary value representing the state of said communication network and the binary value of the target list relating to said communication network.

7. A gateway for routing at least one data frame, said gateway being intended for a communication system of a motor vehicle, said communication system further comprising a plurality of computers and a plurality of communication networks, each computer being connected to the gateway by a communication network, each communication network being either in an active transmission state or in an inactive transmission state, the gateway being characterized in that it is configured for:

receiving a data frame sent by a first computer called "sender", said data frame comprising an item of data relating to an item of electronic equipment of the vehicle called "equipment data", and at least one identifier making it possible to determine the one or more communication networks connecting the gateway to at least one second computer that is the recipient of said equipment data;

determining a first list specifying the active or inactive transmission state of each communication network;

determining, on the basis of the one or more identifiers contained in the received data frame, a second list specifying, for each communication network, whether said communication network has to be switched to its active transmission state to transmit the equipment data;

determining, on the basis of the first determined list and the second determined list, what is called a "target" list indicating whether the transmission state of each communication network is active or has to switch to the active state to transmit the equipment data;

activating a communication network; and transmitting an item of equipment data to a communication network.

8. The gateway as claimed in claim 7, said gateway being configured to identify, on the basis of the first list and the target list, the one or more communication networks that are already in the active transmission state and do not need to be switched to the active transmission state.

9. A system for communicating data frames for a motor vehicle, said communication system comprising the gateway as claimed in claim 8.

10. The system as claimed in claim 9, wherein the gateway is implemented by one of the computers of the communication system.

11. The system as claimed in claim 9, wherein each computer is connected to said gateway by a single communication network.

12. The system as claimed in claim 10, wherein each computer is connected to said gateway by a single communication network.

13. A motor vehicle comprising a communication system as claimed in claim 9.

* * * * *